April 25, 1939.  J. C. CLARK  2,155,402
SUN COMPASS
Filed July 6, 1934  6 Sheets-Sheet 1
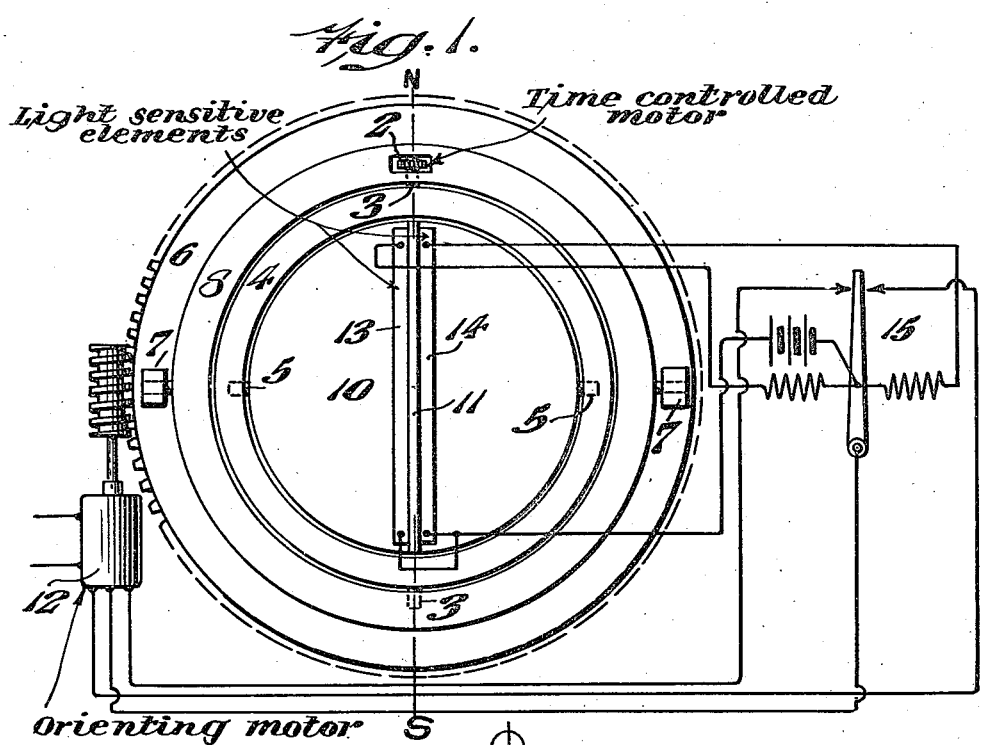
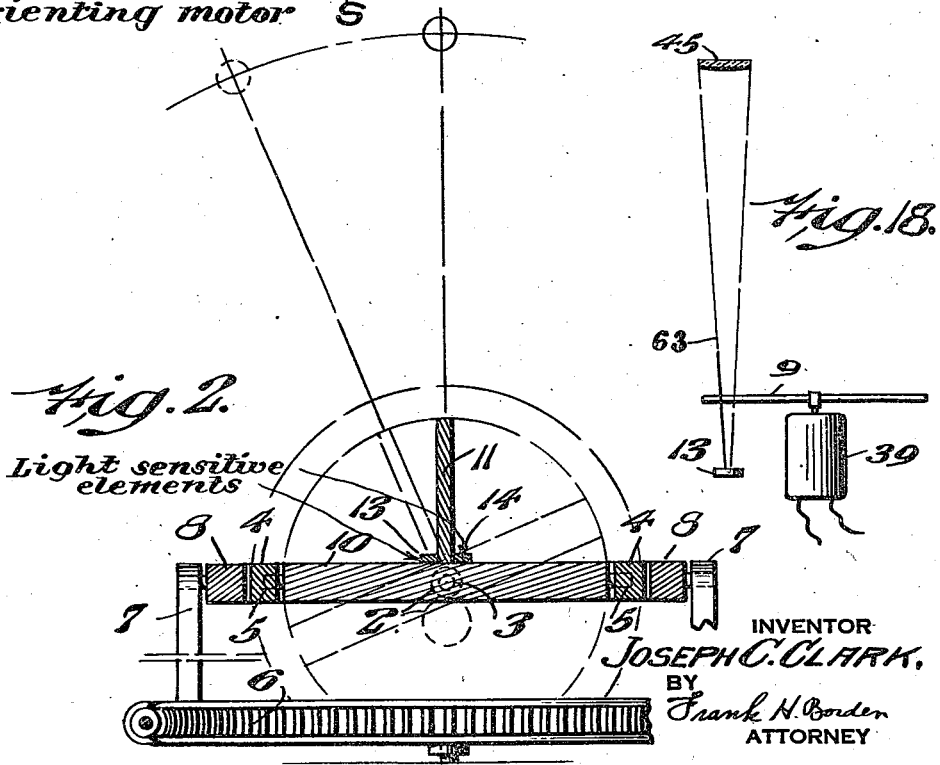
INVENTOR
JOSEPH C. CLARK,
BY
Frank H. Borden
ATTORNEY

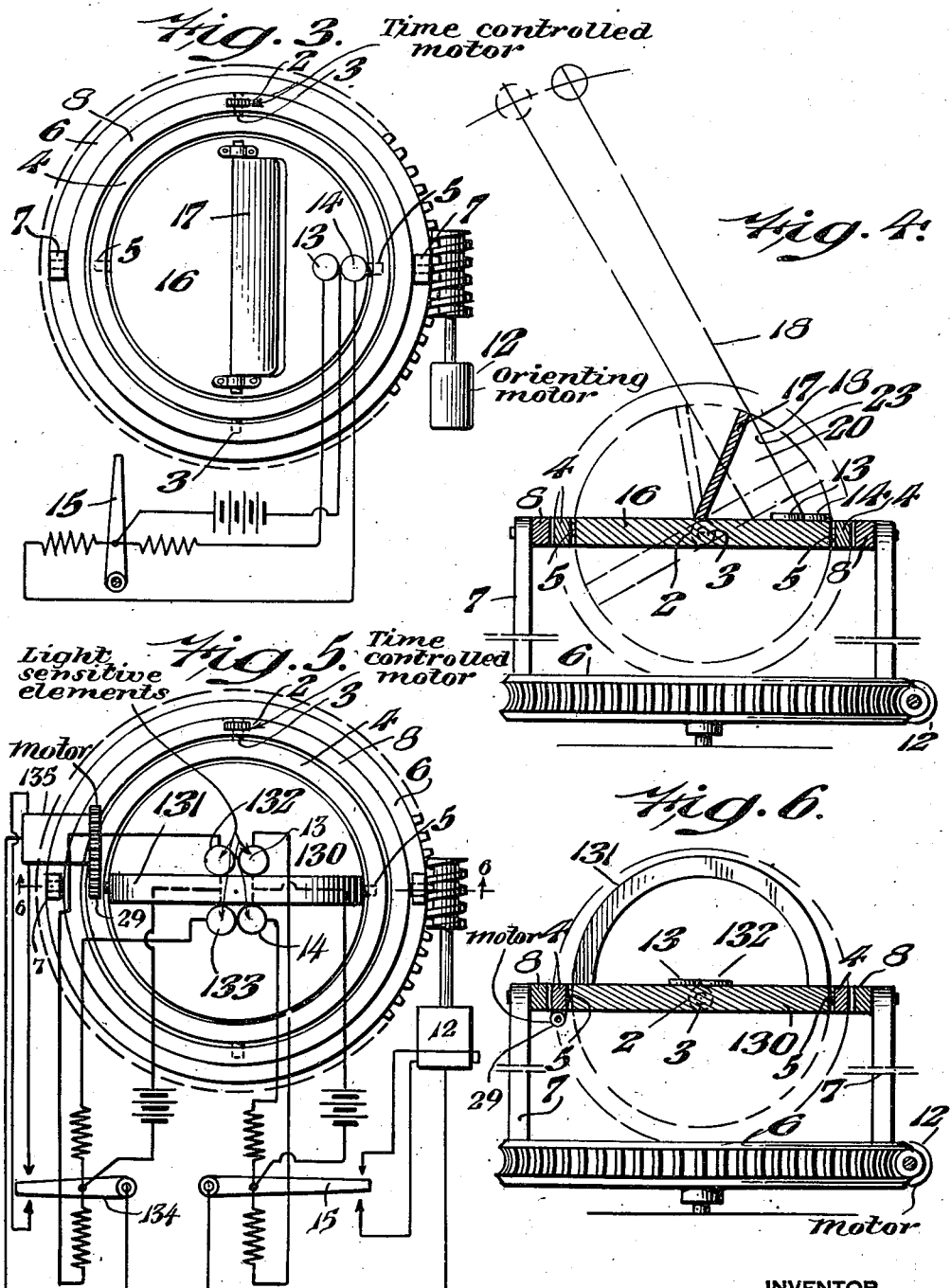

April 25, 1939.                J. C. CLARK                2,155,402
                                SUN COMPASS
                           Filed July 6, 1934         6 Sheets-Sheet 3
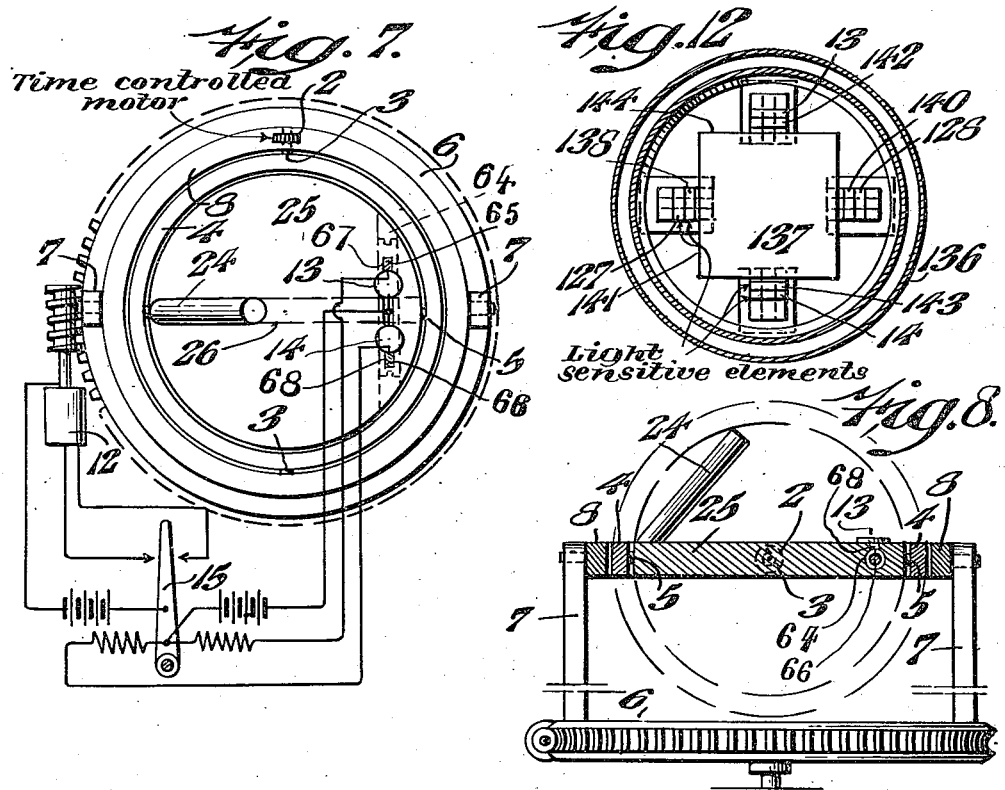
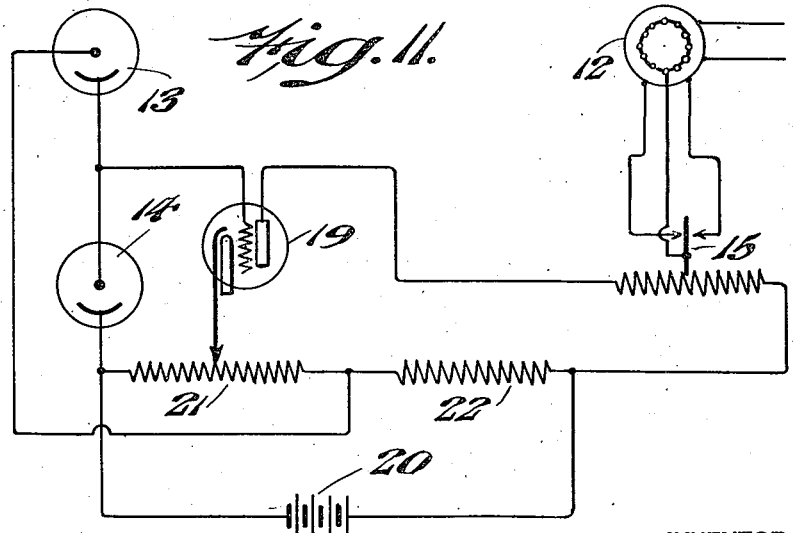
INVENTOR
JOSEPH C. CLARK.
BY
Frank H. Borden
ATTORNEY April 25, 1939.　　J. C. CLARK　　2,155,402
SUN COMPASS
Filed July 6, 1934　　6 Sheets-Sheet 4
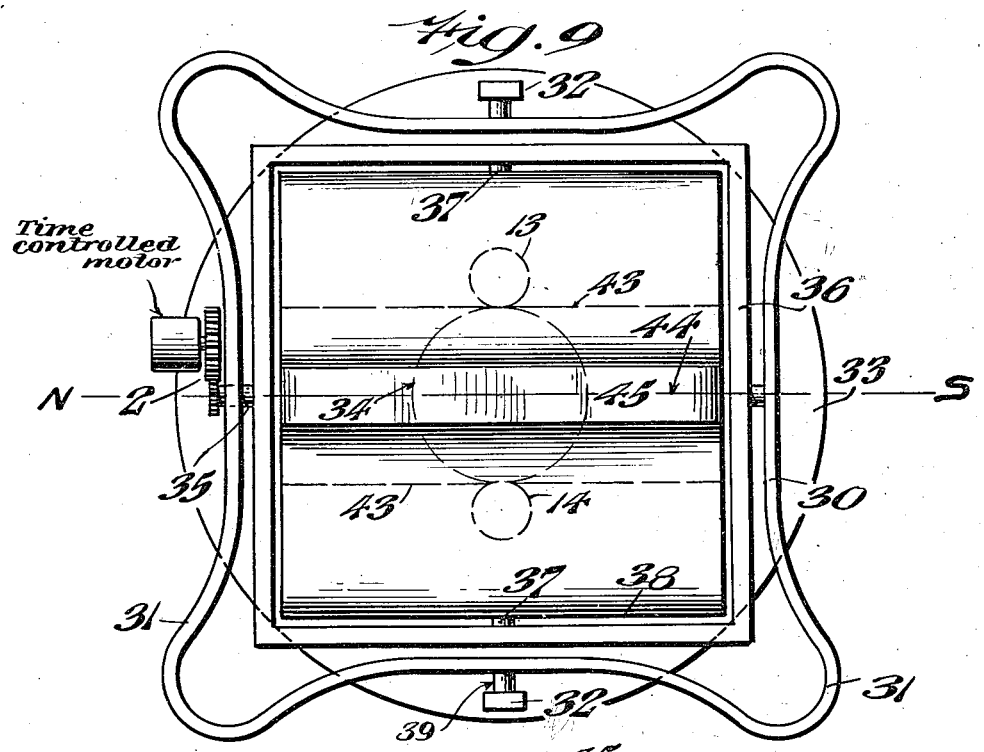
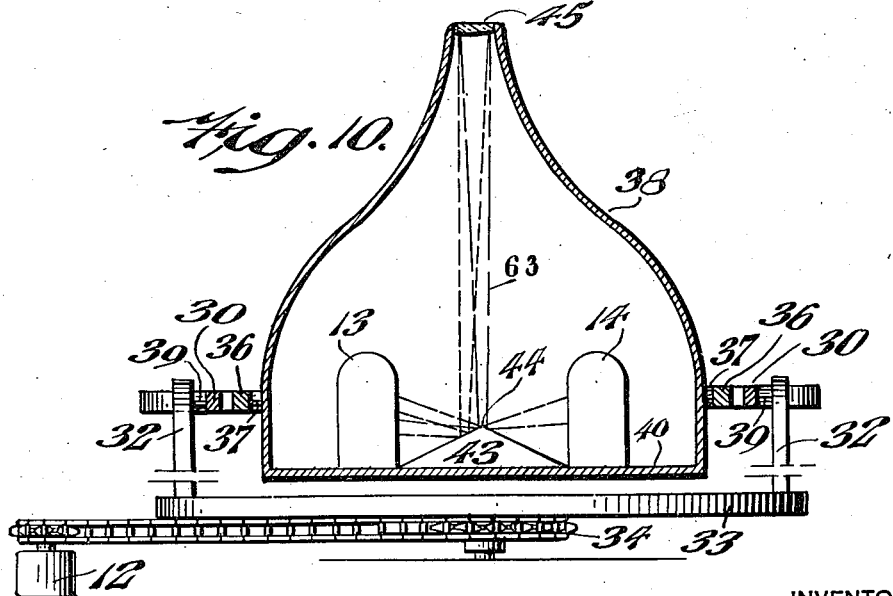
INVENTOR
JOSEPH C. CLARK,
BY
Frank H. Borden
ATTORNEY April 25, 1939.     J. C. CLARK     2,155,402
SUN COMPASS
Filed July 6, 1934     6 Sheets-Sheet 5
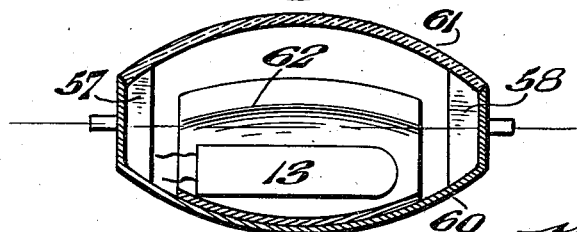
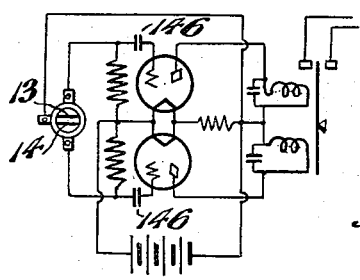
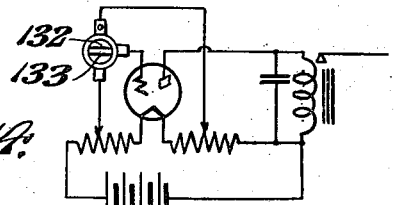
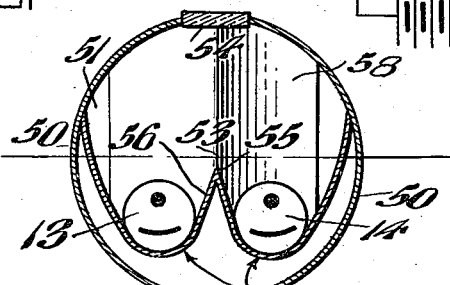
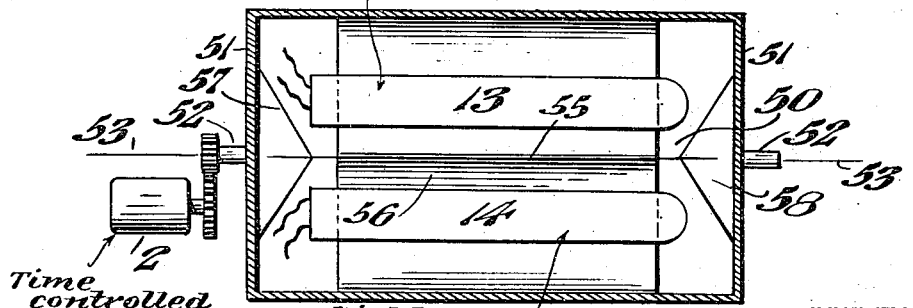
INVENTOR
JOSEPH C. CLARK,
BY
Frank H. Borden
ATTORNEY April 25, 1939.　　　　J. C. CLARK　　　　2,155,402
SUN COMPASS
Filed July 6, 1934　　　　6 Sheets-Sheet 6
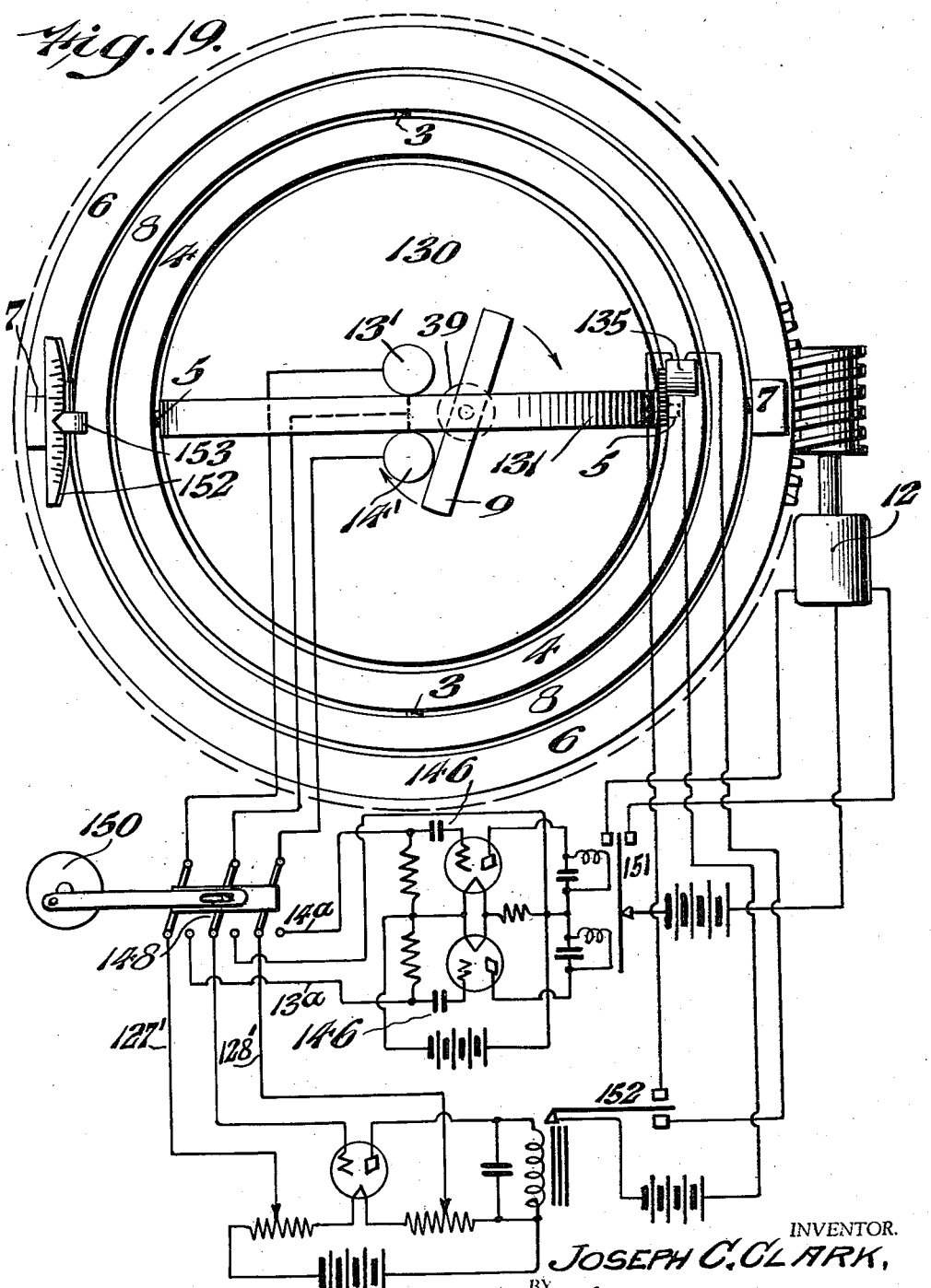
INVENTOR.
JOSEPH C. CLARK,
BY Frank H. Borden
ATTORNEY.

Patented Apr. 25, 1939

2,155,402

UNITED STATES PATENT OFFICE 2,155,402

SUN COMPASS

Joseph C. Clark, Merchantville, N. J., assignor, by mesne assignments, of one-half to Charles Townsend Ludington, Ardmore, Pa., and one-half to Nicholas S. Ludington, Ardmore, Pa.

Application July 6, 1934, Serial No. 734,057

26 Claims. (Cl. 33—61)

This invention relates to a sun compass, and more particularly to a true direction or geographical meridian indicator.

It is among the objects of this invention; to provide a true position indicator which is independent of magnetic errors and fluctuations; to provide a compass operable by the radiant energy of a celestial body; to improve the art of compasses generally; to provide a sun compass of cheapness and of high efficiency; to provide a device supplementary of and an improvement on the navigating instrument shown in my prior application Ser. No. 483,031, filed September 19, 1930; to provide a device arranged for predetermined angular disposition relative to a radiant celestial body by which certain unknowns can be determined if other factors are known, including time, latitude, declination; and many other objects will become more apparent as the description proceeds.

In the accompanying drawings:

Fig. 1 represents a diagrammatic plan of a sun compass exemplifying the principle by one form of the invention in which a vane casts a line or zero negative beam or shadow from which a shadow or negative beam of increased projected area is propagated by angular displacement, Fig. 2 represents a diagrammatic side elevation of the same partially in section, Fig. 3 represents a diagrammatic plan of a modified form of the device in which a vane casts a negative beam or shadow of predetermined area arranged to vary in area in response to angular displacement, Fig. 4 represents a diagrammatic side elevation of the same partially in section on line 4—4, Fig. 3, Fig. 5 represents a diagrammatic plan of a further modified form of the device in which an arcuate or bow shaped radiant energy modifier or controller casts a negative beam or shadow across a supporting plate and relative to two sets of controlling agencies, respectively arranged to rotate the device, and to tilt the bow, Fig. 6 represents a diagrammatic side elevation of the same partially in section, Fig. 7 represents a diagrammatic plan of a further modified form of the device in which the radiant energy controller is a peg or pole, and in which illustratively the radiation responsive devices are arranged for adjustment relative to each other and to the controlled negative beam or shadow cast by the pole, Fig. 8 represents a diagrammatic side elevation thereof, partially in section, Fig. 9 represents a plan of a further modified form of the instrument in which a positive beam is projected arranged for normally equal and symmetrical distribution by reflectors on radiation responsive devices, and which is arranged for asymmetrical incidence on reflectors responsive to angular displacement, Fig. 10 represents a side elevation of the same, partially in section, showing in the respective dotted lines, the relative paths of light rays so directed as to secure the balance and unbalance of the photo-electric circuits as the device is respectively, angularly properly and unproperly disposed, Fig. 11 represents an illustrative wiring diagram of a form that is efficient with the control device disclosed, Fig. 12 represents a transverse section through a modified form of "finder tube" as disclosed in the aforesaid application and as provided so as to dispose of other means for maintaining a selected part in an east-west line, Fig. 13 represents a diagrammatic side elevation partially in section of a further modified form of the device, in which a positive beam is projected through an arcuate astigmatic lens so as to reduce the necessity of tilting for either time or latitude and declination, Fig. 14 represents a transverse vertical section through a further modified form of the instrument in which the positive beam is controlled in a barrel shaped chamber similar to that of Fig. 13, except that the walls are substantially cylindrical, Fig. 15 represents a longitudinal horizontal section through the modification disclosed in Fig. 14 taken on line 15—15, Fig. 14, Fig. 16 represents a wiring diagram of a pair of normally balanced circuits containing two controlling light sensitive devices which respond only to pulsations or relatively abrupt changes of light energy and not to the relatively slower changes of light stimulus, Fig. 17 represents a wiring diagram of a pair of normally balanced circuits containing two controlling light sensitive devices which respond to relatively slow changes in incident light stimulus as well as to relatively abrupt changes therein, Fig. 18 represents diagrammatically an interruptor or pulsator in the path of a light beam incident upon a sensitive element so as to facilitate amplification, and Fig. 19 represents a diagrammatic plan of a further modification of the device in which an arcuate bow or bow-shaped radiant energy modifier or controller casts a negative beam or shadow across a supporting plate and relative to a pair of light sensitive devices, with means for alternately coupling the sensitive devices in two different circuits containing agencies for respectively rotating and tilting the device, and which circuits are respectively responsive to impulses of light stimulus, and to any sort of light stimulus, and showing a shutter device for producing light stimulus pulsations.

The operation of this instrument is based upon the fact that regardless of latitude and declination the relative motion of the sun is from east to west, in substantial planes normal to the geographical axis of the earth and thence normal to the geographical meridians. Allowance is made for the rate of relative speed of rotation of the earth and sun and even for movement of the observer, although, as will be pointed out, the instrument involves such potentialities as to render this unnecessary.

In providing a practicable form of instrument or compass in accordance with this invention, it is preferred to provide one, or a pair of normally balanced photo-electric, heat or other radiation sensitive circuits and means for modifying the radiant stimulus effective upon the sensitive elements of the circuit or of each circuit and so arranged that when the device bears a predetermined angular relation to a source of celestial radiant energy, such as to the sun for instance, means controlled by the circuit is balanced or the plurality of circuits are balanced, and the angular relation in terms of true geographical direction is known. The instrument is further arranged and provided so that deviation from a true geographical direction, and therefore from the predetermined angular relation to the celestial body, causes unbalance of the circuits or of a relay to motivate appropriate mechanism automatically to secure immediate correction of the deviation, to reestablish the proper predetermined angular relation and direction indication.

The instrument is capable of responding to changes in direction, shape, size, intensity or quality of radiant stimulus as regards a given area of stimulation, and in the ordinary case is so arranged as to respond principally to infrared radiation so as to minimize the adverse effects of clouds and fog and to utilize photo-electric or other light sensitive media that are particularly susceptible to this type of radiation. The device is preferably made responsive to differences in stimulus intensity such for instance as either to a shadow, or to a light beam, which are simply negative and positive light stimulus situations, or to combinations thereof. It is preferable that the responsiveness be to a radiation edge or line marking a boundary between relative degrees of intensity of radiation, whether positive or negative or both.

It is contemplated that as an aid in the amplification of the photo-electric circuits under extreme conditions any desired means, such, for instance, as rotating shutters or the like, may be introduced into the system for the purpose of introducing pulsations into the positive or negative light stimulus.

Referring to Figs. 1 and 2, there is disclosed a supporting structure that is available for use with all of the other forms of the invention, but which will be discussed in detail in connection with those figures only. It is desirable that there be provided an adjustable device relative to which the beam propagation takes place, and in the instant figures this comprises a table 10. The beam modifier, qualifier or controller in this instant form comprises a vane 11, which may be as thin or as thick as desired, normally perpendicular to the table 10, but which may be made relatively adjustable so as to variably predetermine the angular relation of vane and table. It will be understood that the table 10 is diagrammatic only, and any form of adjustable element, such as the housings to be later described, and the like, may take its place.

The supporting structure of the preferred type is one that enables adjustment of the parts both in latitude and for declination in one direction, and for time in another direction, while the whole is rotatable in azimuth to correct for deviations in setting. In the instant disclosure a reversing motor 12 is disposed in any desired sort of driving relation to a driven ring or support 6, so as to be capable of selectively rotating the ring 6 in either direction about a substantially vertical axis. Ring 6 carries elevated journals 7 in which the latitude gimbal ring 8 is pivoted. A clock mechanism 2 is mounted on latitude gimbal ring 8, driving a time axle 3, through a friction engagement of any desired sort that permits manual adjustment, while also providing time controlled driving engagement, and a time gimbal ring 4 is mounted on the axle 3 and driven by clock 2. The axis of the axle 3 is at 90° to the latitude axis of journals 7. The time gimbal ring 4 carries a pivotal axis means 5 upon which table 10 is mounted for oscillation. The axis 5 is initially parallel to or coincident with the latitude axis 7, and of paramount importance, is always at 90° to the time axis 3. Disposed on the table 10, and preferably substantially in the plane of its upper surface and on each side of the vane 11 respectively are the light or radiant stimulus sensitive devices 13 and 14, such as light sensitive bridges, photoelectric cells, or thermocouples, and the like. Illustratively, "Clark" cells may be used, as shown for instance in my Patent No. 1,963,692, or my application Ser. No. 37,480, filed Aug. 23, 1935. In the instant form of the invention it will be understood that the time mechanism 2 is one which would turn ring 4 on axis 3 at the rate of one rotation or revolution in twenty-four hours. With the sun above the horizon, in the usual course of use of the instrument, and the time any given daylight hour, the latitude ring 8 would be swung on axis 7 at an angular relation to the plane of ring 6, as to substantially correct for the angular difference in relation of the planes east-zenith and west, and the east-sun and west due to the latitude of the starting position, or until, in the absence of declination, a line perpendicular to the plane of table 10 would be parallel to the rays of the sun incident upon the earth. To adjust for such latitude, there will obviously be provided any desired sort or dial or index as shown in Fig. 19, of the relative angular relations of the rings 8 and 6, or of ring 8 and the perpendicular of ring 6. The day and hour being known, the declination of the sun for that time would be readily known and while setting the instrument in latitude, the table 10 would be swung on its declination axis 5, relative to the time ring 8, in accordance with the correction necessary in the setting for latitude because of the declination of the sun. It might be mentioned at this point that as pointed out in the aforesaid application the declination of the sun is a function of time, being based upon a cycle of one year's time. In this time the declination varies between 23° 27' north, and 23° 27' south. This can be represented by simple harmonic motion using a year's cycle, so that the angular relation between table 10 and ring 4 about axis 5 analogous to the relation between table 130 and ring 4 about axis 5 of Figs. 5 and 6, can be varied in accordance with such simple harmonic motion as by a motor device 29 (Figs. 5 and 6), suitably geared with a crank or pitman (not shown) as to oscillate table 10 (or 130) so as to compensate for declination. In the ordinary course such adjustment will be made manually, as it will be shown to be unnecessary to have exactness in this instant form (Figs. 1 and 2).

However this adjustment is made, whether manually or automatically, the table 10 will preferably be swung on axis 5 until the perpendicular of the table actually lies in a line parallel to the rays of the sun as they are incident upon the instrument. In the disclosure of Figs. 1 and 2, to avoid a confused showing, there has been no apparent adjustments made for either latitude or declination, but for the purposes of that disclosure it will be assumed that the latitude and declination are both zero. Owing to the length of vane 11 it will not make much difference what the angular relation of the sun's rays may be to the perpendicular of table 10 about axis 5—5 in most temperate and tropical zones. After suitable angular positioning has been given for latitude and declination, the table 10 may be swung on the time axis 3 until the center of the sun lies substantially in the plane of the vane, and the energy stimulus of the sun's radiation will be symmetrical upon both sensitive devices 13 and 14. If the point of observation remaining stationary and the clock mechanism 2 functions, then the vane will continue to follow the sun during its relative movement across the sky and the symmetrical balanced stimulation of both devices 13 and 14 will be maintained unless there is movement of the support in azimuth. During this interval of balance the axis N—S passing through axis 3 will lie parallel to the axis of the earth, and hence in a true north and south plane.

In the case first above described the balanced condition will be incident to an equal positive light stimulus on each cell. It is to be understood that as long as the radiation is incident equally upon both the sensitive elements 13 and 14, and the axis N—S points anywhere near true north, it points exactly at true north (except at the instant of 90° ascension). With this arrangement it will be evident that deviation of the axis N—S from true north and south by even a slight fraction of a degree will result in a change in the value of the radiation incident on both elements inasmuch as one will become partially obscured or clouded, and lie, partially at least, in shadow or relative shadow. It will be obvious that unbalance of the incident light will result in unbalance of the electrical circuits controlled by the light, to actuate any desired relay such as 15, to control the circuits causing the running of motor 12 in a determined direction. If but a single sensitive device was used in this form, as cell 13 for instance, the instrument would hunt between true north and a position slightly off true north.

There may be conventional amplifying and other agencies used (not shown) to direct sufficient power on the relay and it will be understood that preferably the photo-electric or thermo-couple devices will be those which are particularly responsive to the infra-red radiation, such, illustratively, as the "Clark" cell noted. Suitable conventional filter devices (not shown) may and preferably will be associated with the instrument as to filter out those rays to which the sensitive devices are not particularly responsive, such for instance as the infra-red filters of the Corning Glass Company, or a very thin sheet of hard rubber. The infra-red sensitive devices enable use of the compass during the daytime in or under adverse weather conditions. The type of device just described above may be characterized as one in which a shadow or negative beam is propogated by misalignment, where there was substantially no shadow before, to orient the table to point true north and south, at which position the shadow has disappeared.

It might facilitate matters if the wiring diagram of Fig. 11 were described at this point as it is applicable to all of the various forms of the device shown hereinafter. The anode of cell 14 and cathode of cell 13 are coupled to the grid of amplifying tube 19. The cathode of cell 14 is connected to the negative of a battery 20, while the anode of cell 13 is connected to some positive voltage higher than the voltage of the cathode of the amplifying tube 19. Relay 15 is connected between the plate of tube 19 and the positive terminal of battery 20. Potentiometer 21 and resistor 22 provide a drop in potential at various points, therefore shifting the center tap of potentiometer 21 changes the potential of the grid in the amplifying tube, thus providing a means for controlling the amount of current flowing through relay 15, and therefore a means for actuating relay 15 due to any change in the light intensity differentiating on cells 13 and 14.

In Figs. 3 and 4 a table 16 is supported in a gimbal suspension for universal movement in two planes on three axes, of which two axes are spaced by and perpendicular to the third axis, as in Fig. 1, and carries a vane 17 adjustable on the table and which table has an axis about which the vane and table may swing together, as in the case of the device of Fig. 1. The photo-electric or light sensitive cells 13 and 14, however, are both on the same side of the vane 17 so that in the normal proper operation of the compass the vane 17 lies in a plane which does not contain the sun or other celestial radiant body but casts a shadow 23, indicated by the triangle formed of the table 16, vane 17 and line 18, which line 18 preferably is disposed between the adjacent cells 13 and 14. In this case a shadow blankets cell 13 and does not affect cell 14 during normal proper positioning of the instrument. A clear illustration of the provision of an edge or line defining between areas of relatively different stimulus intensity. However, movement in azimuth so as to change the shape of the shadow 23, so as to affect the area which it covers on the table 16 will obviously cause unbalance of the photo-electric circuits by either exposing cell 13 or by covering cell 14. Obviously in the manner to be described this will result in reorientation of the system until the shadow 23 covers a predetermined area, at which point true geographical position is indicated by the axis of the time ring 4.

Particular reference should be made to the form of the invention incorporated in Figs. 5 and 6, as it represents a simplification and includes supplemental control means, which while available with other forms of the invention is disclosed in connection with these figures. The important provision of these figures is a table 130 which is directly or indirectly arranged for orientation by reversible orienting motor 12 as in the other just described figures, and the table is also arranged for tilting. Preferably and usually the same gimbal suspension and series of axes of oscillations are made available as in Fig 1. There may also be provided the clock mechanism for rotating the table as in the other forms. An arcuate or bow-shaped shadow caster, or light modifier or interceptor 131, which may well be an arcuate slit or lens as will later be described in connection with Fig. 13, is provided. The arcuate or curved member 131 may have an adjustable relation to table 130 on axis 5—5 or be fixed to table 130 depending upon what relative angular positioning might be desired. At the substantial center of the table the sensitive members 13 and 14 of the aforementioned photo-electric circuits are so disposed as to lie at the edges of the negative light band cast by the intercepter 131. It is recognized that during the day the shadow cast by band 131 would not necessarily be linear, but the area of shadow would always include a narrow band centrally of the table regardless of its shape on either side thereof.

As before, the sensitive devices or cells 13 and 14 will secure orientation of the table and its associated parts when the circuits they control are unbalanced. It will be clear with the arcuate device 131 of this form of the invention disposed with its average substantial plane normally parallel to the earth's axis that the time-controlled rotation of the table and ring must be accurately accomplished, although no allowance whatever for either latitude or declination needs to be made, except at extreme latitudes, as the relative position of the sun in the plane of the bow shadow caster makes but little difference so long as it is above the plane of the table 130. On the other hand, if the device is oriented 90° to the first supposed relationship, but with the several axes in the first disclosed relationship, and is tilted so as accurately to lie in a plane parallel to the plane of relative travel of the sun, so that latitude and declination are accurately accounted for, then the rotation of the device on an axis perpendicular to this plane (of the bow) becomes so unimportant as to be unnecessary, thus eliminating time.

The possibilities for completely automatic utilization of the device, and the elimination of mechanical time controlled or clock mechanism and automatic compensation for declination of the sun, begin to become apparent with the provision in Figs. 5 and 6 of a second set of photo-electric cells or devices 132 and 133. These are disposed immediately adjacent to cells 13 and 14, and are operative upon a relay 134, controlling a reversible motor 135 which might be effective upon an axis lying in the plane of the bow 131 so as to tilt same, in the case of positioning for latitude and declination supplementing or replacing motor 29, as shown in Figs. 5 and 6 effective upon axis 5, or at right angles thereto and effective on the time axis supplementing or replacing the time motor 2, if the correction is to be for time.

As the correction for time will be at a slow rate, this motor 135 when used on axis 3—3 may be relatively slow, while the orienting motor 12, which will require speed, will be faster. It will be clear that if the disposition of the parts of Figs. 5 and 6 is such that a shadow falls on the pairs of cells so as to unbalance both circuits (as will happen regardless of whether the cause is improper orientation or tilting or timing according to the instant particular assembly), it is not possible with this form to decide instantaneously which correction is required. Obviously the unbalancing starts both the orientation and the tilting or timing motors. The orienting motor will have functioned and turned the device in azimuth before much motion will have occurred in tilt or time. If the change in outline or intensity or direction of the beam or shadow was incident merely to improper orientation then it will be clear that with the orienting motor running or responding more quickly than the tilting or timing motor, the deviation from the normal beam or shadow will have been corrected before the tilting or timing motor can have been functioned appreciably. If this (orientation) is not the cause of the abnormal characteristics of the light beam, but it is due to improper tilt or time, then after the device has been oriented by the quicker orienting motor without remedial effect, the slower tilting or timing motor 135 (which will have started at about the same time) will make its operation felt in the changing characteristics of the light beam until it begins to approach the normal predetermined characteristics. At this time it might be the case that the orienting motor will have actuated the device past the true positioning in the opposite direction, resulting in the light beam characteristics changing ultimately toward the opposite state of unbalance of the photo-electric circuits, causing reversal of the orienting motor or actually some slight degree of "hunting" back and forth past the true positioning, until the proper degree of tilt or of timing will have been secured, after which the hunting in orientation or azimuth will cease. Thereafter corrections in azimuth will be made substantially without hunting.

Another manner of securing the same or even better results is comprised in providing that circuits controlled by cells 13 and 14 of Figs. 5 and 6 be impulse circuits, and arranged to function only in response to sudden impulses or unbalancing of the circuits such as might arise from sudden change of the course of the ship containing the instrument. Such impulse circuits would respond to sudden azimuthal swings to actuate the orienting motor to quickly compensate for the changed direction. On the other hand, cell 132 and 133 of Figs. 5 and 6 might be placed in circuits such as shown in Fig. 17, capable of responding to regular changes in balance. In this case the gradual unbalance could only be occasioned by some slow disarrangement such as the passage of time, which would not affect the impulse circuits containing cells 13 and 14 so that correction would be made only in time or tilt as a result of such gradual and slow unbalance. Circuits incorporating these features are shown in Figs. 16 and 17, of which the circuit of Fig. 1 incorporates condensors 146, and responds only to impulses, while the circuit of Fig. 17 responds to gradual unbalance.

In Fig. 19, a device similar to Fig. 5, utilizing the same reference characters is shown, but in which a single pair of cells 13' and 14' is used and is coupled selectively or alternately into circuit like that of Fig. 16, actuating motor 12 and into a circuit like that of Fig. 17, actuating motor 135. The coupling is accomplished by the bi-polar switch or the like 148, actuated by a motor 150. Circuit 13a—14a contains condensors 146 and responds only to pulsations to actuate relay 151, which may be occasioned either by a rapid angular movement when the switch 148 is held closed in that circuit, or in the usual alternations of use either by rapid angular movements, or by a rotating shutter 9 mounted on the table 130, with motor 39 underneath same, which shutter passes close to cells 13' and 14'. The circuit controlling motor 135 has a relay 152 which is responsive to any unbalance of light stimulus on cells 13' and 14' when its leads 127' and 128' are in circuit therewith.

A latitude scale 152' and pointer 153 is provided to indicate latitude adjustments.

In Fig. 12 there is disclosed a transverse section through the finder tube of the navigating instrument of the aforesaid application, the essential characteristic of which is that the longitudinal axis of the tube, perpendicular to the paper, is arranged for predetermined angular relation to the sun or other celestial radiant body, and specifically to extend to point at the sun. Housing 38 and lens or opening 45 of Fig. 10 are exactly analogous to the tube assembly of the recited application. The tube 136 has a target such as a mirror or reflector or absorber 137 which has a square outline in this illustrative disclosure, and is arranged for oscillation on axes parallel, for example, with the edges of the reflector. Pairs of photo-electric or light sensitive surfaces as 138, 140 are diametrically arranged so as to control the adjustments of the tube on an axis parallel with reflector edge 141, being arranged to function when the incident light, coming down the tube, does not register with the reflector 137, but is laterally offset so as to impinge upon either cell 138 or 140. Similar cells or the like 142 and 143 are arranged to control the adjustment of the tube on an axis parallel to the edge 144.

In the disclosure of the aforesaid application there was a recitation of electromagnetic means for orienting the assembly so that a predetermined axis parallel to edges 141 or 144 of the reflector, was maintained in the east-west line. In the instant invention it is contemplated that the maintenance in the east-west line becomes a function of the angular relationships of the device with the radiant celestial body and the electromagnetic compass or other magnetic direction finder can be dispensed with by the provision of suitable supplemental photo-electric circuits controlled by sensitive devices as follows.

Cells 13 and 14 can be provided to orient the tube through suitable motors as will be understood, while cells 127 and 128 can be provided to tilt the tube so as to compensate for latitude and declination relative to and on the plurality of axes to be maintained in the east-west line. The operation of the device of Fig. 12 should readily be understood. Assuming that through suitable means the tube is within the proper angular range of alignment with the sun, there will be a projection of a square beam of light against the square reflector 137. When the tube is properly angularly positioned the light beam will register with the reflector and the circuits of all of the pairs of photo-electric devices will be in balance. (Of course that the beam and reflector are square or any other geometrical outline is a matter of selection and degree. It could be any other shape, and the reflector 137 could be non-reflective and be an absorber as it is only the light that misses reflector 137 that functions the apparatus.)

When angular misplacement occurs the beam not being normal to element 37 will no longer register with element 137 and will creep over one or more sides of the reflector to unbalance either the circuits controlled by cells 138 and 140, or those controlled by cells 142 and 143, or both, to cause actuation of suitable motors (not shown) to angularly adjust the finder or pointer tube to move the beam to registration and re-balance of the respective circuits. Preferably the motors controlled by the cells adjacent the reflector 137 will be of relatively slow speed so as to make proper adjustments.

If the improper registration is incident to deviation in orientation or improper tilt and not to mere change of position, then the primary correction will not be adequate to cause registration of the beam and reflector 137 and the error will increase and the beam will move further and cause unbalance of the additional circuits of cells 13, 14, or of the circuits controlled by cells 127 and 128, or both, to cause actuation of proper motors to correct for the deviation or orientation. The latter motor devices in this case may be of relatively high speed. There may be some occasional hunting, but there will be the maintenance of a mean average setting that will be exact and proper.

In the devices of Figs. 5 and 6, and such of the others as it may be desired so to do, it need not be provided that there are two or more distinct pairs of photo-electric circuits. There may be many situations as for instance aircraft use where small size is essential, or where cheapness is a desideratum in which although adjustments may be desired in two different relationships or directions, as in azimuth or orientation, and in tilt or timing, yet there may reasonably be only room for one set of sensitive devices, or there may be other reasons for the use of but a single set of photo-electric cells or the like. In this case a different type or means of mechanical integration may be resorted to for the purpose of securing the desired results. Thus cells 13 and 14 normally actuate relay 15 controlling motor 12, for orienting the device in response to unbalance of the circuits.

In Figs. 7 and 8 a table 21 is provided for universal positioning as before and contains the upstanding pole or post 24, arranged to cast a shadow across the table 25 upon which the post is mounted, which shadow normally falls between cells 13 and 14. The shadow is indicated by the dotted lines 26 in Fig. 7. It will be clear that departure from the indication of true position will result in unbalance of the photo-electric circuits controlled by cells 13 and 14.

A feature of importance in all of the variations of the invention shown in the several figures is illustratively disclosed in Figs. 7 and 8. This is the feature of the relative adjustability of the cells 13 and 14. Purely by way of example, table 25 has a transverse bore 64 in which the individually rotatable, preferably oppositely threaded, screws 65 and 66 are mounted for rotation, and a threaded extension of respective cells 13 and 14 extends downwardly through slots 67 and 68 for engagement of the screws. Clearly the cells may be moved along the axis of bore 64 and relatively adjusted. This enables accurate adjustment of the cells to the beam.

In order to illustrate a further form of the invention a modification is shown in Figs. 9 and 10 having a supporting structure similar to that described in which an outer gimbal ring 30, having the exaggerated U-shaped corners 31, simply to permit the widest possible swing of the embraced or enclosed housing, is mounted for oscillation on supports or standards 32, in turn carried by a rotary turn-table 33 driven by a gear or other mechanism 34 operated by motor 12 in any desired driven relation. The outer ring 30 has an axis 35 upon which a second gimbal or time actuated ring 36 is mounted, which latter in turn supports the movable housing 38 upon the declination axis 37. The housing 38 has a base 40 and the pair of photo-electric cells or the like 13 and 14, separated and spaced by the angular reflecting element 43, the apex of which latter at 44 is arranged substantially upon the focal axis of the spaced stigmatized lens 45 which may be of any desired characteristics but preferably, comprises a plane upper face and a convex lower face, or vice versa, so as to project the sun's rays as an elongated slit or narrow beam of light. The walls of the chamber or housing 38 are preferably non-reflecting on their interiors so as to reduce stray light.

It will be understood that when the housing 38 has been so disposed upon its several axes that the sun's rays entering lens 45 are focused in beam 63 as a long thin line symmetrical of and on the apex 44 of the reflector 43, there will be an even and equal opposite light dispersion, as by reflected beams shown in dotted lines in Fig. 10, which will stimulate photo-electric cells 13 and 14 to identically the same extent so that the respective circuits containing these cells are balanced. The instrument can be so disposed that at this juncture either the true north and south axis or the true east and west axis may pass longitudinally of the lens 45 and through clock driven axis 35.

The device of Figs. 9 and 10 illustrates characteristics which are common to all of the several forms of invention disclosed herein. It is not possible to have the vertical axis of the housing 38, perpendicular to the longitudinal axis of lens 45, capable of following the sun in its relative travel, if at the same time it is maintained normal to the earth's axis, except at the equinoxes, owing to the declination of the sun, which should cause the housing to travel in a substantial cone substantially concentric to the earth's axis, which is the reason for the introduction of the second or declination axis 37 about which the instrument is swung in accordance with the declination.

With the instrument of Figs. 9 and 10, substantially perfect results are obtained by providing that the ring 30 be positioned on its axis in supports 32 in accordance with latitude, and that the gimbal ring 36 be oscillated about axis 35 in accordance with time, so as to cause the device to continue to point at the sun during the relative motion of the earth and sun, and with the housing 38 also adjusted upon its axis 37 in the gimbal ring 36 in accordance with the declination of the sun. As earlier stated it will be understood that in accordance with the teachings of the aforementioned patent application, the declination of the sun is a function of time capable of representation and correction by simple harmonic motion so that with time controlled means having a time cycle of a year, simple harmonic motion can be introduced into the support of housing 38, or the tables of the other forms, relative to their declination axis 37, to cause the device to continue to compensate for same in a continuously running instrument.

Similarly it will be understood that the clock or similar time mechanism operative upon the instrument or upon the gimbal rings can be so arranged as to provide complete rotation of the pointing or shadow-casting device so as to continue to follow the sun both during daylight and during the night when it is not sun operative and to be operative to pick it up upon the following morning. Obviously the angular relation of the parts on the time controlled axis 37 can be predeterminedly changed if it were desired to observe the same pointing relationship to some other relatively fixed heavenly body at night when the sun is below the horizon. The instrument may be set back say 100° so as to follow a star in its relative course, for instance.

In order to facilitate the pointing and following of the device it will usually be desired to swing the gimbal ring 30 on its axis in accordance with latitude. It will be understood by reference to Figs. 9 and 10, with the device shown with the north-south line coincident with the longitudinal axis of the lens 45, that owing to the length of the narrow beam of projected light, the beam may be angularly divergent from the vertical axis of the housing so that only a portion is incident on reflector 43, yet the balancing of the illumination on the two photo-electric devices will remain. Such angular change of position of the beam might arise from failure to scrupulously allow for either or both latitude and declination, while still adhering accurately to the feature of time. With the instrument offset at 90° so that the lens 45 has its axis coincident with the east-west line, it will then be necessary to pay accurate attention to the latitude position and the declination positioning while permitting considerable leeway on the question of time on the perpendicular axis.

Pursuant to the development of the capabilities of the forms of the device shown in Figs. 5 and 6, as well as in Figs. 9 and 10, the features and advantages of the modifications shown in Figs. 13, 14 and 15 will be readily apparent. The invention shown in those figures represents a device particularly suitable for aircraft, in which the adjustments of the instrument become so simple and for such long periods unnecessary, as to be practically a fixed instrument in which orientation is practically the only functioning.

Referring to Figs. 14 and 15, there is provided a barrel 50, comprised of a substantially cylindrical body, and ends 51 carrying gudgeons, or trunnions 52 for rotatable support of the barrel on axis 53. The barrel will be supported upon the rotatable table 6 (Figs. 1, 2, etc.), so as to be adjustable in azimuth as has been explained. An astigmatic lens or slit 54 is provided diametrically opposite to the peak or ridge 55 of a separating reflector 56 diverging in curved paths from the peak around the respective photo-electric cells 13 and 14 and up into mergence with the inner surface of the barrel well above the axis 53. It will be understood that vertical supplemental bisecting or dividing reflectors 57 and 58 may be disposed on the inner surfaces of the barrel end walls 51. Note that extreme divergence of the beam from the peak 55, finds it incident either directly on a single cell of cells 13 and 14, or on the reflector above the cell so as to be reflected downwardly onto such cell.

The modification shown in Fig. 13 is the preferred form of the invention, and is substantially identical with the structure of Figs. 14 and 15, except that the body is not cylindrical but is a modified sphere 60, having the arched astigmatic lens 61, and discus shaped reflector 62. The mounting, end reflectors, and rotative axis may be the same as in the companion figures.

The arrangement of these elongated rotative substantial barrels is one that can eliminate any adjustments for latitude and declination when used in one plane, and can substantially eliminate or at least materially reduce the amount of timing rotation necessary with certain of the other forms. The operation is quite simple and is dependent for its functioning upon the fact that the rays from the sun may enter at substantially any angle relatively to the longitudinal extent of the lens or slit 54, in the plane of the longitudinal axis of the slit or lens and the peak 55 of the reflector within wide limits in Figs. 14 and 15, and through wider limits in Fig. 13. With the sun's rays entering and directed within the barrel, they either strike the end reflectors 57 or 58, from which they are reflected against the side reflectors and about the cells 13 and 14, or they are incident directly upon some part of the reflector 56 or 62, to be reflected to impinge upon some parts of the cells 13 and 14 so as to energize each equally when the light is symmetrical of the barrel, or to cause the unbalance already described.

The clock mechanism already described may be coupled with the barrels as to turn the barrels on axis 53 in the event the axis 53 is to be maintained on the north-south line. In this case the barrel may be manually set for the latitude and declination, or, within most navigating ranges and certainly in the temperate and tropical zones, the relative angular distance of the setting of the sun in the sky relatively to the vertical will be so far less than 90° as to enable rays of the sun to enter at even more acute angles so as to actuate the cells 13 and 14. If axis 53 is to be kept in an east-west line, then the barrel should be rotated upon its axis until the sun's rays entering are bisected by the reflector when the plane of the longitudinal axis of the lens and the peak of the reflector are in a plane substantially parallel to a plane containing the east, west and sun, and the appropriate circuits are balanced, then the passage of time will be of no consequence so long as the entering sun's rays are incident upon some part of the reflecting surfaces so as to be reflected upon cells 13 and 14 so as to maintain the balanced circuit conditions. Means will be provided whereby the barrel could be manually set perhaps twice daily so as to insure entry of the sun's rays into the barrel despite the relative movement incident to the passage of time. In the usual case it will be preferred that the clock mechanism or other means cause the rotation of the barrel so as to keep the slit or lens or other light modifier or directer extended toward the sun, without making any particular provisions for adjustment for latitude or declination.

In Fig. 18, a bladed shutter 9 is driven by a motor 39 to intercept beam 63 modified or controlled by lens or slit 45 incident on cell 13 to break the beam into pulsations, to actuate amplifying devices.

It will be understood that with all of the forms of the invention disclosed it is never possible for the device to point accidently toward the south instead of toward the north. This is for the obvious reason that the time controlled rotation of the north-south axis and the apparent motion of the sun must be in the same direction to permit balance and continued pointing, else the result would be almost immediate unbalance and re-orientation.

It is preferred in some cases to provide pulsating circuits of a different period from that of the gimbal suspension so as to permit wide swinging on the suspensions without actuation of the controls. The circuits are so arranged that the resultant orientation or tilting for latitude or declination, or for time, is a mean or average of opposite partially or completely cancelling pulsations, so that the resultant setting would be as though there had been no pitching effective on the suspension.

I claim:

1. In a compass, means adjustable in azimuth to lie in a true north and south line, light sensitive means responsive to the radiant energy of the sun, and means controlled by said light-sensitive means to adjust the first means to a predetermined relation to the north-south direction upon deviation of the said means from such relation.

2. A direction indicator comprising a support translatably movable relative to the earth, means movably mounted on the support for azimuthal orientation and having an axis and indicating a desired direction when its said axis lies in a plane containing the axis of rotation of the earth motor means for effecting said azimuthal orientation, and means responsive to the radiant energy of a celestial solar body for actuating said motor means to urge said first means toward maintenance of disposition of the first mentioned axis in said plane regardless of relative movement of the support and the earth.

3. In a compass, means adjustable in azimuth to point toward the north, and celestial radiant energy controlled means for urging said means to point toward the north.

4. A direction indicator comprising means having an axis and azimuthally movable to assume a position with the axis lying in a plane containing the axis of the earth substantially parallel to said axis of the earth and designated as the desired position means for effecting said azimuthal movement, means being arranged to receive solar radiant stimulus and constituted to establish an edge of solar radiant stimulus having different intensities on each side of the edge, a control system including a radiant energy responsive device operatively associated with the edge establishing means and with the movement effecting means and inoperative when the first means is in the desired position and the said edge is predeterminedly incident relative to said responsive device, said control system operative to actuate the movement effecting means to reestablish said desired position when through relative movement of the earth and said first mentioned means the incidence of said edge relative to said responsive device is changed.

5. In combination, rotatable indicating means arranged to assume a predetermined relation to true north and south, means comprising a pair of photo-electric cells in a balanceable circuit energized by celestial radiant energy, motor means in driving relation to the rotatable means to actuate same when the photo-electric cells are unbalanced, means for modifying the light stimulus effective upon the two cells in accordance with deviations from the predetermined relation of said rotatable indicating means so as to unbalance said circuit to cause said motor means to restore said predetermined relation of the first means.

6. In a direction indicator, means rotatable to assume a predetermined relation to true north and south, means for modifying light stimulus from the sun as said means deviates from the predetermined relation, means responsive to the modification of the light stimulus for repositioning said first mentioned means and urging same toward said predetermined relation.

7. In a sun compass, a pointing means, means responsive to the sun's radiation for turning the pointing means in azimuth to a predetermined pointing position, means for causing pulsations of the sun's radiant energy incident upon said second means.

8. In combination, means positionable on one axis to assume a desired angular relation to a line extending to the means from a source of solar radiant energy, means responsive to deviation of the first means from the desired relation on said axis to cause the said means to return to the desired relation, said first means being positionable on another axis substantially perpendicular to the first to assume a desired angular relation to a line extending to the first means from such source of solar radiant energy, and means responsive to deviation of the first means from the desired relation on said other axis to cause the said first means to return to the desired relation, means operatively associated with one of said responsive means to cause it to be responsive only to relatively abrupt changes of angular relation to differentiate the responsiveness on the respective perpendicular axes.

9. In combination, means supported for predetermined angular relation to the sun's rays for movement on an axis normally parallel to the earth's axis, time controlled means to rotate said means on said axis to maintain the said predetermined angular relation, means supporting the first means for orientation about an axis substantially perpendicular to the surface of the earth, a reversing motor arranged to orient said first mentioned means, and means controlled by the sun's radiant energy for reversely actuating the motor.

10. In combination, a light receiving and modifying element comprising means having and movable on an axis and arranged to follow the sun while the axis of the means lies in a north-south position, positioning means controlled by said light receiving and modifying element for automatically repositioning the axis in azimuth when deviations of the axis from the north-south position cause the first means to discontinue following the sun but without turning the means on said axis because of discontinuation of following the sun.

11. In combination, an orientable indicator comprising means having an axis, means for actuating said indicator in either direction about a second substantially vertical axis to urge said means to a position where its said axis lies in a plane containing the earth's axis, said first mentioned means being arranged to receive radiant energy from the sun and constituted to establish a boundary of differential solar radiant stimulus, and means responsive to movements of said boundary to control said means for actuating.

12. In combination, means pointing toward the sun, means orientable about a substantially vertical axis for supporting said first means for oscillation upon a second axis, time controlled means for rotating said first means about such second axis at the same relative speed of rotation as the sun so as to maintain the angular relation of the first mentioned means and the sun, a circuit including a photo-electric cell, orienting means for the supporting means, controlled by differential light effects upon said cell when the angular relation of the first means to the sun has been changed, said cell having substantially fixed relation to said pointing means.

13. In combination, means arranged to receive radiant energy stimulus from the sun and constituted to establish a boundary of differential energy stimulus from the sun, means for rotating said means in timed relation to the relative movement of the sun on an axis lying in a plane containing the earth's axis to cause said first means to continuously follow the sun, a circuit containing a light sensitive cell which circuit is balanced when the boundary of stimulus has predetermined incidence upon said cell when said axis is in said plane but unbalanced when the boundary moves due to azimuthal movements of said first means, and electric power means in said circuit for rotating said first means in azimuth only in response to unbalance of said circuit to reorientate the axis into said plane.

14. In combination, means arranged to assume a desired angular relation to the rays of the sun, means supporting said first mentioned means on two axes each respectively perpendicular to a common axis so as to permit independent adjustments for latitude and for declination of the sun, and time-controlled means for rotating said first means on said common axis perpendicular to the first mentioned axes to maintain the desired angular relation during the passage of time.

15. In a compass, a support, means having an axis and mounted movably on said support, motor means for actuating said means, solar radiation responsive motor controlling means exposed to incident celestial solar radiant energy and responsive to variations from a predetermined incidence of such energy to control the motor means to move the first means relative to the support to a position in which its said axis is in parallelism with the axis of the earth.

16. In an instrument, means comprising an electric circuit including a solar radiant energy responsive sensitive electric element, a reflecting device of greater effective length than width juxtaposed relative to the element so as to cause predetermined reflection of solar radiant energy upon the element when incident radiant energy has predetermined angular relation to the surface of the reflector comprising a wide angle of varying incidences in the line of the reflector effective length and to vary the reflection upon said element as the angle of incidence of such energy varies minutely across the effective width of the reflector due to azimuthal swinging, means in said circuit for orienting said means about a substantial vertical axis in azimuth only to a disposition in which said predetermined incidence of radiant energy upon the reflector is secured again pursuant to said variation of reflection.

17. An instrument comprising means having an axis, means establishing a plurality of photo-electric circuits each containing a light energy sensitive element, driving means operatively associated with said circuits for moving the first means until its axis lies in a plane containing the earth's axis when radiant stimulus from the sun is not equally incident on each element so that the respective circuits are unbalanced, and said driving means controlled by the circuits when unbalanced to orient said first means and said elements to cause restablishment of the balance in radiant stimulus incident on both elements.

18. In combination, a light receiving and modifying element comprising means having an axis arranged to follow the sun while a second axis of the means lies in a north-south position, sun controlled actuating means continuously operatively associated with the first means for automatically repositioning the axis in azimuth when deviations of the second axis from the north-south position cause the first axis to discontinue following the sun, and time controlled means coupled with and to turn said first mentioned means about its second axis at substantially the speed necessary to enable said first mentioned axis to follow the sun.

19. In a compass, a support, means having an axis and adjustable on the support for assumption of a predetermined angular relation to the rays of the sun incident on the means about said axis, time controlled means for rotating the means at a predetermined rate to maintain the angular relation in one plane, said first means having an axis of support normal to the axis of rotation about which said means can be adjusted in accordance with the declination of the sun to maintain the angular relation in another plane normal to the first mentioned plane.

20. In a compass, a support, means having an axis and mounted movably on said support, means exposed to incident celestial solar radiant energy and responsive to variations from a predetermined angle of incidence of such energy to move the first and second means relative to the support to a position in which the said axis is in parallelism with the axis of the earth, and with said second means exposed at said predetermined angle of incidence.

21. In a compass, a support, means having an axis and mounted movably on said support, means exposed to incident celestial solar radiant energy and responsive to variations from a predetermined angle of incidence of such energy to move the first and second means relative to the support to a position in which the said axis is in parallelism with the axis of the earth, and means for causing the radiant energy to be incident on said second mentioned means in pulsations in order to facilitate amplification.

22. In an instrument, means comprising an electric circuit, spaced radiant energy sensitive electric elements in said circuit, a pair of nonparallel reflectors mutually intersecting in a line edge lying in a plane between the sensitive elements, means for establishing a boundary of differential radiant energy stimulus of relatively positive and negative value meeting in slightly spaced substantial lines from an external source of radiation, which boundary is normally symmetrically incident on said line edge to secure equal reflected stimulation of both elements when the means has predetermined angular relation to the rays of radiant energy from said source of radiation, means controlled by said circuit actuating said second means upon unbalance of the circuit through differential reflections from the pair of reflectors and unbalanced stimulation of the sensitive elements when the boundary is asymmetrical of said line edge to correctingly move said means to reestablish symmetrical relations of the energy boundary and the line edge of the reflectors, the arrangement being such that the circuit is not unbalanced by mere shifting of the boundary of stimulus longitudinally of the line edge of the reflectors.

23. In combination, means pointing toward the sun, means for supporting said first means for oscillation upon mutually perpendicular axes, time-controlled means for rotating said first means on one axis at the same relative speed of rotation as the earth so as to maintain a predetermined angular relation of the first mentioned means and the rays of the sun in one plane, a circuit including a photo-electric cell, said cell being mounted substantially in fixed position relative to the first mentioned means so as to be continuously operatively associated therewith during its movement, orienting means for moving the said first mentioned means about the second axis and controlled and actuated by differential light effects upon said cell controlled by said pointing means when the predetermined angular relation of the first mentioned means to the sun in another plane has changed.

24. In combination, means supported on two substantially perpendicular axes, means including electric circuits for actuating the first means on each of said axes, a radiant energy sensitive element, and means for alternately incorporating said element selectively in each of said circuits.

25. In a compass, means adjustable in azimuth to point toward the north and having a portion exposed to the incident rays of the sun, said means having adjustment about axes lying in a plane perpendicular to the meridian plane to establish predetermined incidence of the sun's rays upon said means to accord with latitude and declination of the sun, said exposed portion having a wide angle of reception of the sun's rays to secure predetermined incidence upon said means, parallel to said first mentioned plane during the passage of a predetermined time interval to obviate the necessity for timed oscillation of the means in such first mentioned plane during such predetermined interval, and celestial radiant energy controlled means operatively associated with said first means normally inactive during predetermined incidence of the sun's radiant energy in both planes and arranged for activity to urge said means to point toward the north when the angle of incidence of the sun's rays relatively changes because of azimuthal swings.

26. In combination a light receiving and modifying element comprising means having an axis arranged to follow the sun while a second axis of the means lies in a north-south position, primary sun controlled actuating means continuously operatively associated with the first means for automatically repositioning the axis in azimuth when deviations of the second axis from the north-south position cause the first axis to discontinue following the sun and effects movement of the actuating means, and secondary sun controlled actuating means continuously operatively associated with the first means to turn said first means about its second axis to cause the first axis to follow the sun during its relative movement, said respective actuating means being provided and arranged for differential responses to the discontinuation of following of the sun so as to accord the proper correction depending upon whether the discontinuation of following the sun is due to azimuthal swings or improper tilt.

JOSEPH C. CLARK.